THERMISTOR CONTROLLED SIGNAL DELAY CIRCUIT

Filed Sept. 25, 1963

INVENTOR.
LUIGI J. RUSSO

BY Vincent L. Carney
ATTORNEY

United States Patent Office 3,294,982
Patented Dec. 27, 1966

3,294,982

THERMISTOR CONTROLLED SIGNAL DELAY CIRCUIT

Luigi J. Russo, Springfield, Pa., assignor to Burroughs Corporation, Detroit, Mich., a corporation of Michigan Filed Sept. 25, 1963, Ser. No. 311,416
11 Claims. (Cl. 307—88.5)

This invention relates to monostable multivibrators and more particularly, to monostable multivibrators that are useful as pulse delay circuits.

It is frequently desirable to introduce a controlled delay into a pulse circuit. Such a delay may be necessary in order to permit comparison of one pulse with the succeeding pulse, or to permit a circuit component to be turned on before pulses are applied to it. Pulse delay circuits find wide application in digital computers, pulse code modulation systems, and radar systems.

Such delays are sometimes obtained from circuits which utilize the charging or discharging times of capacitive networks. Monostable multivibrators that obtain delay from capacitors are frequently used. However, they are only capable of producing delays of short duration, for example, 100 microseconds. Circuits utilizing the Miller Effect can produce much longer delays, but these circuits are relatively complex. Accordingly, it is an object of this invention to provide an improved delay.

It is a further object of this invention to provide a simple pulse delay circuit, which is capable of relatively long delay times.

It is a still further object of this invention to provide a monostable multivibrator which is turned off by the change in resistance of a resistor having a high temperature coefficient through which current from the monostable multivibrator flows.

In accordance with the above objects, a monostable multivibrator is provided having a first current valve, which is normally non-conducting, and a second current valve, which is normally conducting. To delay a voltage pulse, it is applied to the input of the first current valve, which causes this valve to switch from its non-conducting state to its conducting state. A cross-over network from the first current valve to the second current valve turns the second current valve off to its non-conducting state when the first current valve is turned on to its conducting state.

The current from the first current valve flows through a thermistor (a semiconductor, the resistance of which changes with its temperature, or, in other words, a resistance having a high coefficient of temperature). The current flow through the thermistor heats it, causing its resistance to change. The thermistor, in turn, initiates the turning off of the first current valve. Cross-over networks between the second current valve and the first current valve turn the first current valve back off and turn the second current valve on in a regenerative switching action.

The second current valve turns off when an input pulse is applied to the first current valve and turns back on after a period of time determined by the heating of a thermistor by the current from the first current valve. The turning off and the turning back on of the second current valve generate a first voltage pulse. This first voltage pulse is differentiated to provide two other voltage pulses, a pulse of the same polarity corresponding with the leading edge of the first voltage pulse and a pulse of the opposite polarity corresponding with its trailing edge. The leading-edge pulse is blocked and the trailing-edge pulse is passed to the output of the delay circuit. This trailing-edge pulse is considered as the delayed input pulse.

The invention and the above noted and other features thereof will be understood more clearly and fully from the following detailed description with reference to the accompanying drawings in which.

Figure 1:
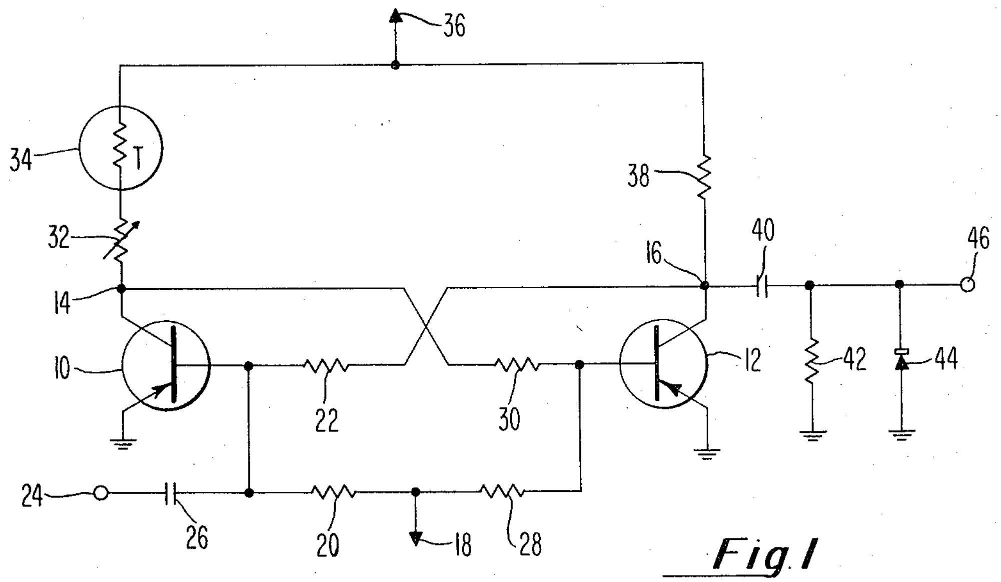
FIGURE 1 is a schematic circuit diagram of an embodiment of the invention.

Referring now in particular to FIGURE 1, a schematic circuit diagram of an embodiment of the invention is shown having a first PNP transistor 10 and a second PNP transistor 12. The emitters of the transistors 10 and 12 are both grounded. The collector of transistor 10 is electrically connected to terminal 14; the collector of transistor 12 is electrically connected to terminal 16. The base of transistor 10 is electrically connected to a source of positive potential 18 through the resistor 20, to the terminal 16 through the resistor 22, and to an input terminal 24 through the capacitor 26; the base of transistor 12 is electrically connected to the source of positive potential 18 through a resistor 28 and to the terminal 14 through a resistor 30.

The terminal 14 is electrically connected in series to the variable resistance 32, to the thermistor 34, and to a source of negative potential 36 in the order named. The terminal 16 is electrically connected to the source of negative potential 36 through the resistor 38 and to one plate of a capacitor 40. The other plate of the capacitor 40 is electrically connected to one end of the resistor 42, to the cathode of diode 44, and to output terminal 46. The other end of the resistor 42 and the anode of diode 44 are grounded.

While the circuit of FIGURE 1 is quiescent, the transistor 10 is biased so as to be cut off and the transistor 12 is biased so as to be conducting. The negative voltage source 36 provides the necessary collector bias voltages for both transistors and provides the forward bias for transistor 12, which is in saturation. The potential at terminal 16 is at ground level due to the current flow through resistor 38. Transistor 10 is reversed biased by the source of positive voltage 18, which is electrically connected to its base. The collector potential at terminal 14 is substantially negative due to the negative potential of source 36. This potential maintains the transistor 12 in saturation. The current through the thermistor 34 is approximately equal to the voltage of the source 36 divided by the combined resistances of the thermistor 34, the potentiometer 32, and the fixed resistor 30.

When a negative input pulse is applied to terminal 24, the transistor 10 is forward biased and switched into its conducting state. The potential at terminal 14 rises from its negative value towards ground. This causes the transistor 12 to be reversed biased by the source of positive potential 18 so that it switches from saturation to a non-conductive state. When the transistor 12 becomes non-conducting, its collector potential at terminal 16 becomes negative. This negative potential is coupled to the base of transistor 10 to provide regenerative switching action so as to hold the transistor 10 in its conducting state.

When the transistor 10 begins to conduct, the current through the thermistor 34 increases from a value which is approximately equal to the voltage of the source 36 divided by the combined resistances of the thermistor 34, the potentiometer 32, and the fixed resistor 30 to a value which is approximately equal to the potential of the source 36 divided by the combined resistances of the thermistor 34 and the potentiometer 32. The increased current through the thermistor 34 causes its temperature to rise and therefore causes its resistance to decrease. This, in turn, causes the current through the thermistor to increase further, resulting in a further decrease in its resistance.

This series of events repeats until the base current of the transistor 10, as determined by the combined resistance of the resistor 22 and the resistor 38, is no longer sufficient to maintain the transistor 10 in saturation. At this time the collector of the transistor 10 begins to go negative. This negative value is coupled to the base of the transistor 12 causing it to go into conduction. The transistor 10 is now switched into its non-conducting state by the switching of transistor 12 into its conducting state.

The multivibrator has generated a negative-going voltage pulse at terminal 16 in a series of operations starting with the negative input pulse to terminal 24 and ending with the switching back into conduction of transistor 12 by the temperature increase of the thermistor 34. The leading-edge and the trailing-edge of this voltage pulse are differentiated through the action of the capacitor 40 and the resistor 42 to form a negative voltage pulse corresponding in time to the application of the input pulse to terminal 24 and a positive voltage pulse corresponding in time with the return of the multivibrator to its quiescent state. The negative-going pulse is blocked from the output terminal 46 by the diode 44, which provides a short to ground; the positive-going pulse is passed to terminal 46 since it reverse biases the diode 44. With existing thermistors, delays may be provided of from several seconds to several minutes. The amount of delay can be varied by changing the resistance of the potentiometer 32.

A similar multivibrator may be obtained according to this invention by placing the thermistor 34 in the emitter of the transistor 10 rather than in its collector circuit. This thermistor or "sensistor," however, must have a high positive temperature coefficient rather than the usual negative temperature coefficient. Its resistance with zero current through it must be very small (of the order of 25 to 55 ohms). Then, when the multivibrator is triggered by a negative pulse applied to terminal 24, causing the transistor 10 to become saturated, the current through the thermistor 34 increases its temperature and also its resistance. The increase in resistance of the thermistor or sensistor 34 causes base current of the transistor 10 to decrease. This, in turn, causes the transistor 10 to become less conductive and the circuit reverts to its quiescent state after a delay time that is dependent upon the characteristics of the thermistor. Changes in ambient temperature can be compensated for by placing a thermistor in series with or in parallel with resistor 22.

Figure 2:
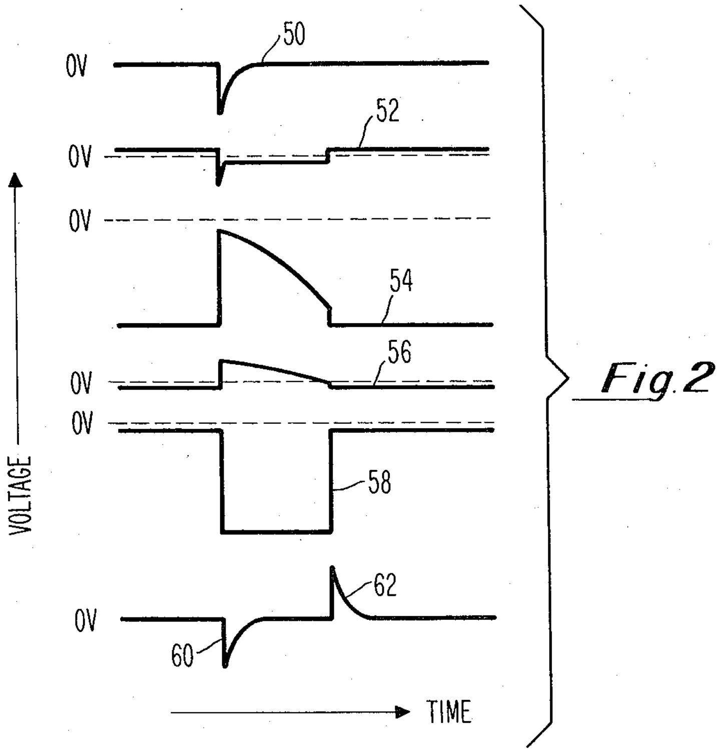
FIGURE 2 is a graph showing a plurality of voltage waveforms which occur at different points in the circuit of FIGURE 1.

FIGURE 2 is a graph having several curves that represent voltage waveforms each of which occurs at a different point in the circuit of FIGURE 1. All of the curves have the same abscissas representing time; each of the curves has individual ordinates representing voltages.

The negative-going voltage pulse 50 is applied to the input terminal. It is desired to produce a positive pulse at the output terminal 46 some predetermined time later. The negative pulse 50 switches the transistor 10 on, which in turn switches off transistor 12. The negative voltage pulse 52 is the superimposed result of the input pulse 50 which is applied to the base of transistor 10 and the biasing action from the collector of transistor 12 through the cross-over network to the base of transistor 10. As shown by the waveform 52, the voltage on the base of transistor 10 is slightly positive when the multivibrator is in its quiescent condition. When the multivibrator is developing an output voltage, the base of transistor 10 is slightly negative. It returns to a slightly positive potential when the multivibrator returns to its quiescent condition.

The voltage waveform 54, which appears at the collector of transistor 10, rises from a value of potential that is substantially negative due to the source 36 to a value close to ground when the multivibrator is switched on. As the resistance of the thermistor 34 falls due to the increase of collector current in the transistor 10, the voltage at the collector of transistor 10 drops back down to a negative potential close to that of the source 36.

When the voltage 54 at the collector of transistor 10 rises toward ground level, the voltage 56 at the base of transistor 12 rises from its slightly negative value to a positive value which it receives from the positive voltage source 18, and biases the transistor 12 to cut off. As the voltage 54 at the collector of transistor 10 drops back to its negative voltage as determined by the source 36, the voltage at the base of transistor 12 drops back to its slightly negative voltage and biases transistor 12 into saturation. When the voltage 56 at the base of transistor 12 rises to its positive value to reverse bias this transistor, the voltage at terminal 16 falls from a slightly negative voltage to a substantially negative potential. This voltage 58 remains at this negative level until transistor 12 turns back on and the multivibrator returns to its quiescent state.

The negative-going voltage pulse 58 at terminal 16 is differentiated by the action of the capacitor 40 and the resistor 42 to result in the negative pulse 60, which occurs on the leading-edge of the negative voltage pulse 58, and in the positive pulse 62, which results from the trailing-edge of the negative voltage pulse 58. The negative pulse 60 is blocked and the positive pulse 62 appears at the output terminal 46. This pulse is delayed a period of time from the input pulse shown in the curve 50, which period of time is determined by the thermistor 34 and the potentiometer 32.

It can be seen that the circuit shown in FIGURE 1 is a simple, inexpensive delay which can be varied over a wide range of relatively long periods of time. It operates in the range of several seconds to several minutes. It also has all of the ruggedness and reliability of circuits which are entirely solid state.

Obviously, many modifications and variations of the present invention are possible in the light of the above teachings. It is therefore to be understood that within the scope of the appended claims the invention may be practiced otherwise than as specifically described.

What is claimed is:

1. The combination comprising:

an input terminal adapted to receive an electrical pulse;

current valve means, electrically connected to said input terminal and adapted to be connected to a source of electrical potential, for permitting the flow of current through itself upon receiving said electrical pulse from said input terminal;

temperature-sensitive means, electrically connected to the output of said current valve means, for turning off said current valve means after a predetermined amount of electrical charge has flowed through said current valve means; and pulse generator means, electrically connected to said current valve means, for generating an output pulse that is coincident with the trailing-edge of the current pulse developed by said current valve means.

2. Apparatus for delaying an input signal pulse by a predetermined amount of time comprising:

an input terminal adapted to receive said signal pulse;

current switch means having a control terminal electrically connected to said input terminals;

temperature-sensitive means, electrically connected to said current switch means and adapted to be connected to a source of electrical potential, for passing electrical charges from said source of electrical potential through the switch means for a predetermined time after receiving said signal pulse from said input terminal; and pulse generator means, electrically connected to said temperature-sensitive means for providing an output signal pulse upon the termination of said predetermined time.

3. Apparatus for delaying an input signal pulse by a predetermined amount of time according to claim 2 in which said temperature-sensitive means includes a thermistor.

4. Apparatus for delaying an input signal pulse by a predetermined amount of time comprising:

pulse generator means for generating a voltage pulse between the time it receives a first trigger pulse and the time it receives a second trigger pulse;

an input terminal adapted to receive an input signal pulse;

current valve means, electrically connected to said input terminal and to said pulse generator means, for providing said first trigger pulse to said pulse generator means upon receiving said input signal pulse;

temperature sensitive means, electrically connected to said current valve means and to said pulse generator means, for supplying said second trigger pulse to said pulse generator means a predetermined amount of time after said current valve means provides said first trigger pulse to said pulse generator means; and differentiating means, electrically connected to the output of said pulse generating means, for providing a delayed pulse concurrent with the trailing-edge of said pulse from said pulse generating means.

5. A monostable multivibrator comprising:

an input terminal adapted to receive a trigger pulse;

first electrical switch means, electrically connected to said input terminal and having a conducting state and a non-conducting state, for changing from one state to the other upon receiving said trigger pulse;

second electrical switch means, electrically connected to said first electrical switch means and having a conducting state and a non-conducting state, for being triggered to the opposite state as said first electrical switch means by said first electrical switch means when said first electrical means receives said trigger pulse;

temperature-sensitive means, electrically connected to said first electrical switch means and to said second electrical switch means, for switching said second electrical switch means back to its original state a predetermined time after said first electrical switch means receives said first trigger pulse; and an output terminal electrically connected to the output of said second electrical switch means.

6. A monostable multivibrator according to claim 5 in which said temperature-sensitive means includes a thermistor electrically connected to said first electrical switch means so as to conduct the current passing through said first electrical switch means.

7. A monostable multivibrator according to claim 6 in which said first electrical switch means and said second electrical switch means are each solid state devices.

8. A monostable multivibrator according to claim 6 in which said first electrical switch means and said second electrical switch means are each grounded emitter PNP transistors.

9. Apparatus for delaying a signal pulse comprising:

first electrical switch means, having a conducting state and a non-conducting state and being adapted to be connected to a source of electrical potential, for being triggered from a first of said states to a second of said states upon receiving said signal pulse;

second electrical switch means, having a conducting state and a non-conducting state and being adapted to be connected to a source of electrical potential for being switched to the opposite state as said first electrical switch means by said first electrical switch means when said first electrical switch means switches from said first state to said second state;

temperature-sensitive means electrically connected to the output of said first electrical switch means and to the input of said second electrical switch means, for switching said second electrical switch means back to its original state after a predetermined amount of electrical charge has flowed through said temperature-sensitive means from the output of said first electrical switch means;

differentiating means, electrically connected to the output of said second electrical switch means, for providing an output pulse when said second electrical switch means switches back to said original state.

10. Apparatus for delaying a signal pulse according to claim 9 in which said temperature-sensitive means includes a thermistor.

11. Apparatus for delaying a signal pulse comprising:

a first PNP transistor having its emitter grounded;

a second PNP transistor having its emitter grounded;

an input terminal electrically connected to the base of said first PNP transistor;

the base of said first transistor being electrically connected to the collector of said second transistor through a resistor;

the base of said second transistor being electrically connected to the collector of said first transistor through a resistor;

a source of positive potential being electrically connected to the base of said first transistor through one resistor and to the base of said second transistor through another resistor;

a thermistor having one end electrically connected to the collector of said first transistor, and having its other end electrically connected to a source of negative potential;

a resistor having one end electrically connected to the collector of said second transistor and having its other end electrically connected to said source of negative potential;

a differentiating network electrically connected to the collector of said second transistor;

a diode having its cathode electrically connected to said differentiating network and having its anode grounded; and an output terminal electrically connected to the cathode of said diode.

References Cited by the Examiner

UNITED STATES PATENTS 3,149,293 9/1964 Farkas ------------ 307—88.5

OTHER REFERENCES

Basic Theory and Application of Transistors, Army TM 11-690, March 1959, page 203 relied on.

Keister, Ritchie & Washburn—The Design of Switching Circuits, Copyright 1951 by D. Van Nostrand Co., Inc.; page 38 relied on.

Brown & Beter—"Transistors: A New Class Of Relays"—Control Engineering, December 1956, pp. 70–76 relied on.

References Cited by the Applicant

John Markus and Vin Zeluff—"Ultra-Low Frequency Oscillator For Range From 0.1 to 0.02 c.p.s."—Handbook of Industrial Electronic Control Circuits; McGraw-Hill Book Co., Inc. (New York, Toronto, London—1956) pp. 169 and 170.

ARTHUR GAUSS, *Primary Examiner.*

R. H. EPSTEIN, *Assistant Examiner.*